Patented Aug. 1, 1933

1,920,795

UNITED STATES PATENT OFFICE 1,920,795

PRODUCTION OF HYDROCYANIC ACID

Alphons O. Jaeger, Mount Lebanon, Pa., assignor to The Selden Company, Pittsburgh, Pa., a Corporation of Delaware No Drawing. Application September 16, 1929
Serial No. 393,118

14 Claims. (Cl. 23—151)

This invention relates to the production of hydrocyanic acid by catalytic processes in the vapor phase.

Hydrocyanic acid can be produced catalytically by the reaction of two gaseous components one of which contains carbon and the other nitrogen, one of the components also containing hydrogen and the other component containing oxygen. In other words, for example ammonia, that is to say a component containing nitrogen and hydrogen, can be caused to react with carbon monoxide, a component containing carbon and oxygen, or methane or similar gaseous hydrocarbons such as ethylene, acetylene, etc., can be caused to react with oxides of nitrogen. Under certain circumstances the carbon containing group may also contain methanol or formaldehyde.

Other methods of preparing hydrocyanic acids catalytically consist in the catalytic dehydration of formamide or ammonium formate, and are included in the present invention.

According to the present invention the catalytic reaction of two components, are containing carbon and the other nitrogen, at least one containing hydrogen and at least one containing oxygen, is effected at a suitably elevated temperature in the presence of a new class of contact masses. These contact masses contain zeolites which are the reaction products of at least three classes of components, that is to say, at least one silicate, at least one metallate, and at least one metal salt, the basic radical of which is a metal capable of entering into the non-exchangeable nucleus of the zeolite. Throughout the specification and claims these zeolites will be referred to as multi-component zeolites.

The multi-component zeolites used in making catalytic compositions of the present invention may possess high base exchanging power or in many cases may possess lower base exchanging power since the catalytic value of the final compositions is not primarily dependent on the amount of base exchanging power present.

The multi-component zeolites included in the contact masses of the present invention may be associated with diluents, preferably in the form of a physically homogeneous structure, as will be described below. Either diluted or undiluted multi-component zeolite bodies may be present in the contact masses used in the present invention and it should be understood that wherever multi-component zeolites are referred to both diluted and undiluted bodies are included.

Catalytically active components may be associated with diluted or undiluted multi-component zeolite bodies in four main forms. (1) They may be physically admixed or impregnated into the multi-component zeolite bodies. (2) They may be physically homogeneously incorporated into the multi-component zeolite bodies before the latter have been completely formed as catalytically active diluent bodies, or in the form of diluents which have been impregnated with catalytically active substances. (3) They may be chemically combined in the multi-component zeolites in non-exchangeable form, that is to say they may form part of the non-exchangeable nucleus of the multi-component zeolite present in the final contact mass. (4) They may be chemically combined in exchangeable form either during formation of the multi-component zeolite or by base exchange after formation. Obviously, of course, the same or different catalytically active components may be present in more than one of the above described forms and it is an advantage of the present invention that catalytically active substances may be introduced in a wide variety of forms which gives a large field of choice to the catalytic chemist.

While three of the methods of combination of catalytically active substances may be effected with undiluted as well as diluted multi-component zeolites I have found that for the production of hydrocyanic acid, diluted multi-component zeolite bodies present many advantages, particularly where the diluents are of a physical nature such as to exert a desired influence on the catalytic activity of the contact masses as when, for example, the diluents by reason of high porosity, capillarity or surface energy may be considered as physical catalysts or activators.

Multi-component zeolites used in the preparation of contact masses of the present invention behave as if they were products of extremely high molecular weight for catalytically active components can be introduced either into the non-exchangeable nucleus or in the form of exchangeable bases in practically any desirable proportions, and the ordinary law of chemically combining proportions in which the components can be incorporated chemically appears to be without force, which makes it reasonable to assume that the molecular weight is so high as to completely mask the effect of the law. It is, of course, possible that the multi-component zeolites, or some of them, may be solid solutions of a plurality of related compounds of lower molecular weight. It has not been possible hitherto to definitely settle this question as multi-component zeolites are not readily capable of structural chemical analysis. The present invention is, of course, not limited to any theory but irrespective of the underlying reasons the fact that catalytically active components may be chemically introduced in any desired proportions is of enormous importance to the catalytic chemist and puts him in the position of being able to produce an almost unlimited number of finely and gradually toned catalysts or contact masses for the catalytic production of hydrocyanic acid. In all cases the contact masses produced are highly effective by reason of the desirable physical structure of the multi-component zeolite bodies contained therein and the wide limits of homogeneous dilution of catalytically active molecules or atoms with resulting uniformity and smoothness of action which is of great importance.

Another important advantage of contact masses containing multi-component zeolite bodies lies in the fact that these contact masses are extremely resistant to high temperatures required for the production of hydrocyanic acid. It should be clearly understood that multi-component zeolites even though possessing the same empirical chemical formula are quite different products from the ordinary two-component zeolites of commerce which are the reaction products of only two classes of zeolites, that is to say soluble silicates and metallates or soluble silicates and metal salts. The multi-component zeolites which are used in contact masses of the present invention possess the tremendous advantage that any desired catalytically active component can be readily introduced in the form in which it is best available or most desirable. This is of great importance for when contact masses are prepared containing two-component zeolites it is sometimes impossible and frequently very difficult to introduce a number of catalytically active components for some of the component radicals are capable only of forming metallates and others are only capable of forming metal salts of a character suitable for the formation of the zeolites. The choice of components to be incorporated in a two-component zeolite is, therefore, considerably narrowed whereas in the multi-component zeolites used in contact masses of the present invention components can be introduced in the particular form, that is to say metallates or metal salts, in which they are most desirable or are most readily available. This gives the catalytic chemist an enormous field of choice and constitutes one of the most important advantages of contact masses used in the present invention.

In addition to the important characteristics with which multi-component zeolite bodies endow the contact masses of the present invention, it has been found that in many cases it is desirable to stabilize the contact masses and this may be effected by associating with the multi-component zeolite bodies or incorporating or forming therein compounds of the alkali-forming metals, that is to say the alkali metals, the alkaline earth metals, and the strongly basic earth metals. These compounds appear to slow up or smooth out the catalytic reaction and will be referred to throughout this specification and claims as stabilizers. The stabilizers may be non-alkaline, weakly alkaline, or strongly alkaline, depending on the nature of the contact mass desired and on the reaction conditions under which it is to be used. It is an important advantage of the present invention that in most multi-component zeolites a greater or less amount of alkali forming metal oxides are present as exchangeable bases, and they form stabilizers which are combined in or associated with the resulting multi-component zeolite bodies in an extremely fine state of division in which the activity of the stabilizers is peculiarly effective. Thus, multi-component zeolite bodies containing alkali forming metal exchangeable bases may be considered as complex stabilizers.

In addition to the use of stabilizers, which are important in connection with many of the contact masses used in the present invention, it has been found that the stabilizer action and the overall efficiency of the contact masses can, in many cases, be greatly increased or enhanced by the association therewith or chemical combination therein of elements or radicals or groups which are catalytically active but which do not possess specific catalytic activity for the production of hydrocyanic acid. Thus, for example, it will be noted that the reaction involves the production and splitting off of water. For this reason it is desirable in many of the contact mass compositions of the present invention to incorporate or include catalysts or catalytic components which are not specific catalysts but which may favor dehydration. In other cases different non-specific catalysts may be used and are of importance. In this connection it should be noted that the effectiveness of different catalytic components will vary with the temperature at which the reaction takes place and that at one temperature a component may be a specific catalyst whereas at another temperature, frequently a lower reaction temperature, the particular component may no longer be a specific catalyst. These non-specific catalysts will be referred to throughout the specification and claims as "stabilizer promoters" and the expression is intended to have no other meaning. The concept of stabilizer promoters is therefore not intended to define the chemical individuals or groups but is relative and refers to the action of the catalytic groups under the reaction conditions obtaining. The use of the expression "stabilizer promoter" should in no sense be taken to limit the invention to a particular theory of action of these non-specific catalysts and in fact in some cases stabilizer promoters may be present where there are no stabilizers.

The tremendous range of chemical groups which may be combined in or with or incorporated in multi-component zeolite bodies permits a wide choice of stabilizer promoters as well as specific catalysts and permits their association with the contact masses in an extremely homogeneous and catalytically efficient form. Thus, many multi-component zeolites may be considered as combined catalysts, stabilizers, and stabilizer promoters as all of these elements may be present in the same chemical compounds and sharing the advantages flowing from its desirable physical structure and chemical properties. Of course, both stabilizer and stabilizer promoters may be mixed partly or wholly with the multi-component zeolite bodies and a single stabilizer promoter may be present partly in physical admixture and partly in chemical combination as will be clear to the skilled zeolite chemist.

The multi-component zeolites which form the important components in contact masses of the present invention may be prepared by any of the well known methods. In each case at least one silicate is caused to react with at least one metallate and at least one metal salt. For the purposes of this application the term "metallate" will be given a somewhat broader definition than that sometimes used and includes not only the alkaline solutions of amphoteric metal oxides or hydroxides but also alkali-forming metal salts of metal acids, such as the oxyacids of metals of the fifth and sixth groups of the periodic system which in at least one stage of oxidation are not strictly speaking amphoteric but which products are capable of reacting with silicates and metal salts to form multi-component zeolites. Throughout the specification this somewhat more general definition of metallates will be strictly adhered to.

In the formation of multi-component zeolites by wet methods the final reaction product must be alkaline to litmus, and for products of high base exchanging power it should be neutral or alkaline to phenolphthalein. For the purposes of the present invention high base exchanging power is not essential in all cases and multi-component zeolites of lower base exchanging power which are produced under conditions resulting in a final reaction acid to phenolphthalein but alkaline to litmus may be used with advantage. It is not definitely known whether in all such cases a compound of homogeneous composition is formed and it may be that in some or all cases a mixture of multi-component zeolites and non-base exchanging polysilicates may be produced. For the purposes of the present invention, however, a reaction product of silicates, metallates and metal salts will be considered as a multi-component zeolite body if it possesses any base exchanging power.

It is desirable for many purposes to add the relatively acid components, that is to say normally the metal salt components to the relatively more alkaline components, such as the silicates and metallates. This method continuously assures a reaction which is alkaline to litmus and which will usually be neutral or alkaline to phenolphthalein. The continuous alkalinity is assured automatically and such processes not only result in products having the best base exchange power but also can be carried out with a minimum of skilled supervision. The procedure in which relatively acid components are added to the relatively alkaline components may also be considered as the preferred method of forming multi-component zeolites for use in contact masses of the present invention which, however, is in no sense limited to contact masses containing multi-component zeolites produced in this manner and on the contrary many effective contact masses may be produced by reactions in which the converse procedure is adopted, that is to say the more alkaline components are added to the more acid components.

The character of the multi-component zeolites will in general vary with the relative proportions of the different components entering into reaction. Thus, products in which the silicates and metallates predominate over the metal salts resemble two-component zeolites of the aluminosilicate type, products in which the silicates and metal salts predominate over the metallates resemble two-component zeolites of the aluminum double silicate type, and finally, products in which the metallates and metal salts predominate over the silicates bear certain resemblance to non-silicious base exchange bodies. It will be clear that there are no sharp dividing lines between these three types of multi-component zeolites and on the contrary one type shades into the other as the relative proportions of the components vary.

While, as has been stated above, the present invention includes processes in which either diluted or undiluted multi-component zeolites are used, it is preferable in most cases to utilize diluted multi-component zeolites in the contact masses for carrying out the present invention. It is desirable, though not essential, that the diluents be homogeneously incorporated into the multi-component zeolites before formation of the latter or at least before the multi-component zeolite has set after formation. Many diluents, inert, stabilizing, activating, catalytically active, or having stabilizer promoter effects, can be used. A few of the diluents will be briefly enumerated:— powdered base exchange products, natural or artificial powders of rocks, stones, tuffs, trass, lava, and similarly volcanic products which are frequently highly porous, greensand, pulverized slag wool, cements, sand, pulverized earthenware, fullers earth, talc, glass powder, pumice meal, asbestos, graphite, activated carbon, quartz meal, various pulverized minerals rich in quartz, metal powders and metal alloy powders, salts of oxymetal acids such as tungstates, vanadates, chromates, uranates, manganates, cerates, molybdates, etc., particularly copper, iron, silver or thorium salts of the above, silicates, such as copper silicate, iron silicate, nickel silicate, cobalt silicate, aluminum silicate, titanium silicate, zirconium silicate, minerals or ores, especially those rich in copper and iron, etc. Finely divided diluents are of great advantage, especially when the average particle size is less than 60 microns, in which case the diluents possess high surface energy, which increases the adsorptive and absorptive capacity of the contact mass, the diffusion speed and porosity. These finely divided diluents may be considered as physical catalysts or activators. Diluted or undiluted base exchange bodies or their derivatives, silicious or non-silicious, may be finely divided and used as part or all of the diluents of the multi-component zeolites used in the contact masses of the present invention.

The following nine methods are the most effective for the introduction of diluents but any other suitable methods can be used.

(1) The diluents may be mixed with one or more liquid components of the multi-component zeolite to be formed when the latter are prepared by wet methods.

(2) Components, either catalytically active, stabilizer promoters, or others, may be precipitated or impregnated into diluent bodies which are then incorporated into the multi-component zeolite by any suitable methods of incorporation.

(3) Diluents may be mixed with multi-component zeolites when the latter are still in the form of gels, by kneading or stirring, in which case the base exchange gel behaves as an adhesive. The homogeneity and uniformity of the distribution of the diluents is of course not quite so great by this method as by method (1), but for many purposes extreme uniformity is not essential.

(4) Diluents may be formed during the formation of the multi-component zeolites by mixing suitable compounds with the components of the multi-component zeolites so that the diluent particles are precipitated during formation. Protective colloids may be added to prevent coagulation of the diluent particles before the multi-component zeolites have become sufficiently set.

(5) Compounds may be added which react with certain of the multi-component zeolite forming components to produce diluents, for instance, salts of the metal acids of the fifth and sixth groups may be added in sufficient excess so that they react with components of the multi-component zeolite to form insoluble diluents, as for example with heavy metal oxides.

(6) Preformed multi-component zeolites, diluted or undiluted, artificial or natural, can be impregnated with true or colloidal solutions of catalytically effective components and then dried.

(7) A preformed multi-component zeolite, diluted or undiluted, may be impregnated with a plurality of solutions which react therein to precipitate any desired diluents.

(8) Soluble diluent compounds may be added to the components forming a multi-component zeolite, which after formation retains the compounds in solution and is dried without washing or is treated to precipitate the compounds.

(9) Natural multi-component zeolites or artificial multi-component zeolites, diluted or undiluted, or their derivatives, may be impregnated with solutions of the desired compounds, which are then precipitated by means of reactive gases.

The nucleus or non-exchangeable portion of the molecules of the multi-component zeolites may be considered to contain two types of oxides, namely, relatively basic metal oxides, usually amphoteric, and relatively acidic oxides, such as $SiO_2$ and certain other oxides of similar properties which can replace part of the $SiO_2$. The nucleus behaves as a single acid radical and cannot be split by ordinary chemical means without far-reaching decomposition but it is advantageous to consider the two portions of the nucleus are basic and acidic portions bearing in mind, of course, that the nucleus behaves as a single group. The metal components which are capable of forming the basic portion of the nucleus are salts or metallates of the following metals:—copper, silver, gold, bismuth, beryllium, zinc, cadmium, boron, aluminum titanium, zirconium, tin, lead, thorium, niobium, antimony, tantalum, chromium, molybdenum, tungsten, uranium, vanadium, manganese, iron, nickel, cobalt, platinum, palladium. Compounds of these elements may be introduced singly or in mixtures, in any desired proportions, and may be in the form of simple or complex ions. It should be understood that some of the elements in certain stages of oxidation may be introduced either as metallates or metal salts. Others may be introduced in only one form, and still others may be introduced in a stage of oxidation other than that desired in the final base exchange body or in the form of complex compounds. Among the complex ionogens are ammonia, hydrocyanic acid, oxalic acid, formic acid, tartaric acid, citric acid, glycerine, and the like.

Many of the metals are specific catalysts, others are stabilizers and still others are stabilizer promoters. The status of an element as catalyst or stabilizer promoter may vary with the particular reaction conditions and with the nature of the contact mass.

Examples of components forming the relatively acid portion of the multi-component zeolite nucleus are alkali metal silicates, which are soluble in alkali, and alkali metal salts of acids, such as those of boron, phosphorus, nitrogen, etc.

The exchangeable bases of the multi-component zeolites may be substituted by base exchange, and the elements which can be introduced singly or in admixture by base exchange are the following:—copper, silver, gold, ammonium, beryllium, calcium, manganese, zinc, strontium, cadmium, barium, lead, aluminum, titanium, zirconium, tin, antimony, thorium, vanadium, thallium, bismuth, chromium, uranium, manganese, iron, cobalt, nickel, palladium, platinum, and cerium.

The exchangeable bases introduced may be specific catalysts, they may be stabilizers, or they may be stabilizer promoters. They may be introduced as simple ions or as complex ions and may enhance the catalytic activity of the final contact mass, improve its physical strength, or both.

Multi-component zeolites may also be coated in the form of lms on massive carrier granules or may be impregnated therein. The massive carriers may be inert, activating, or themselves catalysts.

The present invention is not limited to the use of any particular temperatures and the range of temperatures used with contact masses of the prior art are applicable to processes using multi-component zeolite contact masses of the present invention.

*Example 1*

The following mixtures are prepared:

(1) 12–16 mols of $SiO_2$ in the form of a water glass solution are mixed with 0.25 mol of sodium tungstate in the form of as high a concentrated solution as possible, and 0.3 mol of sodium molybdate of as high a concentration as possible and about 1 mol of pulverized titanium dioxide is stirred in.

(2) 1 mol of $V_2O_4$ is dissolved in caustic potash to form a 5% solution of potassium vanadite.

(3) 1 mol of potassium chromite is dissolved in water to form a solution of maximum concentration.

(4) A 10% potassium aluminate solution containing 1 mol of $Al_2O_3$ is prepared.

(5) 1 mol of thorium nitrate is dissolved to form a 10% solution.

Mixtures (1), (2) and (3) are combined and a mixture of the solutions (4) and (5) is run in with vigorous agitation. Care should be taken that the reaction remains neutral to phenolphthalein or slightly alkaline. A gelatinous mass containing alkali metal, aluminum, vanadyl, chromium, thorium, $SiO_2$, tungstic acid and molybdic acid forms at once, which is sucked dry on a Buchner filter, dried and calcined. The base exchange body so formed contains titanium dioxide in homogeneous subdivision within its framework in a finely divided state.

The base exchange body is an excellent contact mass for the synthesis of hydrocyanic acid from ammonia and carbon monoxide or carbon monoxide containing gases, and the efficiency of the catalyst can be still further increased by the exchange of the alkali for rare earths, earth metals or manganese. The presence of a highly porous carrier or diluent within the zeolite, such as activated carbon or silica gel, or other metal oxide gels, materially increases the catalytic action; while the presence of dehydrogenation catalysts within the diluent, such as bauxite, titanium dioxide, zirconium dioxide, or a mixture of manganese carbonate and bauxite reduced with hydrogen or methyl alcohol has a favorable influence. Gases containing carbon monoxide, such as water gas or the like, can be used in place of carbon monoxide itself, and a smoother reaction is obtained if the hydrogen in the water gas is present in amounts from one to ten times the volume of the ammonia present. Natural gas, kerosene or other petroleum vapors and other hydrocarbons, such as acetylene, ethylene and the like, can also be used. The most effective way in which to employ these gas mixtures is to mix them with ammonia and to heat the reaction mixture thus formed quickly to reaction temperatures at high gas velocities.

Oxides or other compounds of titanium, rhodium, osmium, lanthanum, cerium, molybdenum, praseodymium, and other rare earth elements may also be present, either in physical or chemical combination, in the catalyst mass, and the presence of such dehydration catalysts as copper aids materially in effecting the reaction.

Oxides of nitrogen may be used instead of ammonia with any of the hydrocarbons mentioned, either with or without additional hydrogen. The presence of steam is in some cases not objectionable. By the incorporation of oxides of aluminum, titanium or zirconium, especially in the presence of alkali or alkaline earth metal compounds, undesired reduction of metal oxide or other metal compound carriers by hydogen present in the reacting gases can be hindered.

The reaction is most advantageously carried out at temperatures from 400 to 700° at atmospheric, subatmospheric or superatmospheric pressures. With higher gas speeds the reaction temperature can advantageously be maintained, however, as high as 900° C. The hydrocyanic acid may be absorbed in activated carbon or silica gel, or an ammonium salt can be formed by injecting additional ammonia into the gaseous reaction product.

Example 2

A diluent is prepared as follows:

(1) 10 parts of pulverized siderite ore are thoroughly mixed with 15 parts of pulverized titanium dioxide, or cerium oxide, or a mixture of the two may be used.

(2) 30 parts of 39° Bé. waterglass are diluted with an equal amount of water.

(3) 1.5 parts of chromium in the form of a chromium nitrate solution, as highly concentrated as possible, are treated with sufficient caustic soda of as high a concentration as possible to dissolve up the hydroxide first precipitated.

(4) 0.5 parts of chromium in as high a concentrated solution as possible in the form of a chromium nitrate solutior are mixed with solution containing 0.5 parts of aluminum in the form of as high a concentrated solution as possible of aluminum nitrate.

Mixtures (2) and (3) are mixed and are impregnated into the powder (1), whereupon the whole is treated with solution (4). The mass is formed into granules and is thoroughly dried and calcined.

The base exchange body so formed is mixed with the waterglass solution of Example 1, and the catalyst prepared as described in that example. A stabilized catalyst containing chromium and titanium as stabilizer promoters results. As these are very efficient dehydrogenation catalysts the formation of hydrocyanic acid is greatly improved thereby, and good yields are obtained when a mixture of ammonia and carbon monoxide is passed over the catalyst at reaction temperatures.

Salt like bodies can be formed by causing the base exchange body to react with salts of the acids of tungsten, chromium, molybdenum or vanadium, especially after base exchange, where the latter has been used to introduce further cations in exchangeable form. A reaction mixture containing formamide or ammonium formate when passed over such complex compositions of catalyst gives good yields of hydrocyanic acid.

Example 3

The following mixtures are prepared:

(1) 250 parts of freshly precipitated ferric oxide are suspended in water to form a very dilute suspension, and are then treated with 15 parts of bismuth chloride with vigorous agitation. The hydrolysis of the bismuth chloride can be accelerated by the addition of ammonia. The basic bismuth oxide which is precipitated is absorbed by the iron oxide and to this suspension 7-9 mols of sodium waterglass are added together with a small amount of ammonia.

(2) 1 mol of copper nitrate is dissolved in ammonia to form a dark blue cuproammonium compound, and the solution is diluted to 5% strength.

(3) 1 mol of aluminum nitrate is dissolved in water to form a 20% solution.

Mixtures (1) and (2) are combined and (3) is added, precipitating out a product from the reaction mixture which should remain slightly alkaline.

After the gelatinous product has been washed and pressed, it is given a subsequent washing with a little dilute waterglass solution and then dried, whereupon the mass is broken into fragments, which are calcined, and constitute a contact mass for the production of hydrocyanic acid from reaction mixtures containing oxides of nitrogen and unsaturated hydrocarbons, either in the presence or in the absence of small quantities of oxygen at a low red heat.

Example 4

11-13 mols of $SiO_2$ in the form of potassium waterglass are diluted with 7-10 times the amount of water rendered slightly ammoniacal, whereupon 250 parts of very finely divided pure zinc spar are stirred in. A solution containing 1 mol of potassium chromite in the form of an N/2 solution and 1 mol of cuprammonium nitrate in the form of an N/10 solution is added with stirring, and finally 1 mol of copper in the form of a 10% copper nitrate solution is poured in, whereupon the mass becomes gelatinous. The base exchange body is subjected to an intense subsequent treatment with a magnesium nitrate solution, thoroughly washed and dried, and constitutes a magnesium-chrome-copper base exchange body diluted with zinc spar.

A mixture of ammonia and natural gas, the latter being in excess, is passed over this catalyst at temperatures from 400 to 700° C., and in a short time an efficient conversion to HCN sets in. In the presence of nickel, which can be introduced by base exchange, higher reaction temperatures may be used and steam may be present to stabilize the reaction. The presence of a higher percentage of $SiO_2$ in the zeolite also exerts a stabilizing influence and tends to prevent decomposition of the reaction product.

It is apparent that the compounds of nitrogen and carbon, such as ammonia and carbon monoxide can be present in the reaction mixture either as two separate compounds or in combination, as for example in the form of ammonium formate or formamide. In the claims, therefore, the term "reaction mixture" will be used to include mixtures containing these compounds as well as mixtures containing oxides of nitrogen and hydrocarbons whether these constituents are present separately or in the same compound or both.

This application is in part a continuation of my co-pending application Serial No. 142,783, filed October 19, 1926, Patent No. 1,728,732, dated September 17, 1929.

What is claimed as new is:

1. A method of producing hydrocyanic acid which comprises passing a mixture selected from the group consisting of carbon monoxide and ammonia; oxides of nitrogen and aliphatic hydrocarbons; and formamid over a contact mass containing at least one multi-component zeolite with which a dehydration catalyst is associated at temperatures of 400–900° C.

2. A method of producing hydrocyanic acid which comprises passing a mixture selected from the group consisting of carbon monoxide and ammonia; oxides of nitrogen and aliphatic hydrocarbons; and formamid over a contact mass containing at least one diluted multi-component zeolite with which a dehydration catalyst is associated at temperatures of 400–900° C.

3. A method according to claim 1, in which the contact mass contains stabilizer promoters.

4. A method according to claim 2, in which the contact mass contains stabilizer promoters.

5. A method according to claim 2, in which the diluent includes material of high porosity and surface energy.

6. A method according to claim 1, in which the nitrogen is in combination with hydrogen and the carbon is in combination with oxygen.

7. A method according to claim 2, in which the nitrogen is in combination with hydrogen and the carbon is in combination with oxygen.

8. A method of producing hydrocyanic acid, which comprises passing a reaction mixture containing ammonia and carbon monoxide at reaction temperatures over a contact mass containing at least one multi-component zeolite at temperatures of 400–900° C.

9. A method of producing hydrocyanic acid, which comprises passing a reaction mixture containing ammonia and carbonmonoxide at reaction temperatures over a contact mass containing at least one zeolite in which is included at least one compound of a metal of the third, fourth and fifth groups of the periodic system at temperatures of 400–900° C.

10. A method according to claim 8, in which the reaction mixture contains hydrogen in amounts of from one to ten times the volume of the ammonia.

11. A method according to claim 8, in which a hydrogenation catalyst is present in the contact mass.

12. A method of producing hydrocyanic acid, which comprises passing a mixture containing at least one oxide of nitrogen and at least one hydrocarbon at reaction temperatures over a contact mass containing at least one multi-component zeolite at temperatures of 400–900° C.

13. A method of producing hydrocyanic acid, which comprises passing a mixture containing formamide or ammonium formate at reaction temperatures over a contact mass containing at least one multi-component zeolite at temperatures of 400–900° C.

14. A method according to claim 13, in which the reaction mixture contains hydrogen.

ALPHONS O. JAEGER.